United States Patent
Abiko et al.

(10) Patent No.: US 8,847,447 B2
(45) Date of Patent: Sep. 30, 2014

(54) MOTOR ASSEMBLY, DRIVE DEVICE FOR HYBRID VEHICLE, AND METHOD OF MANUFACTURING THE SAME

(75) Inventors: Jun Abiko, Kariya (JP); Koji Kamiyama, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 329 days.

(21) Appl. No.: 13/284,183

(22) Filed: Oct. 28, 2011

(65) Prior Publication Data
US 2012/0104904 A1    May 3, 2012

(30) Foreign Application Priority Data
Oct. 29, 2010    (JP) ................. 2010-243095

(51) Int. Cl.
*H02K 24/00* (2006.01)
*G01D 5/20* (2006.01)
*H02K 7/00* (2006.01)
*H02K 11/00* (2006.01)

(52) U.S. Cl.
CPC ............ *H02K 11/0031* (2013.01); *H02K 7/006* (2013.01); *H02K 24/00* (2013.01)
USPC ................. 310/68 B; 324/207.24

(58) Field of Classification Search
USPC ................. 310/68 B; 324/207.25
See application file for complete search history.

(56) References Cited

U.S. PATENT DOCUMENTS

| | | | | |
|---|---|---|---|---|
| 7,030,607 B2 * | 4/2006 | Ando et al. | ............. | 324/207.25 |
| 7,646,194 B2 * | 1/2010 | Makino | .................. | 324/207.25 |
| 7,705,505 B2 * | 4/2010 | Kataoka et al. | ............. | 310/168 |
| 7,868,504 B2 * | 1/2011 | Kataoka et al. | ............. | 310/168 |
| 7,923,889 B2 * | 4/2011 | Tou | ....................... | 310/216.121 |
| 8,169,111 B2 * | 5/2012 | Yoshimura | ................ | 310/68 B |

FOREIGN PATENT DOCUMENTS

| | | | | |
|---|---|---|---|---|
| JP | 11-352201 A | | 12/1999 | |
| JP | 2003-205756 | * | 7/2003 | ............. B60K 17/04 |
| JP | 2004-222488 A | | 8/2004 | |
| JP | 2006-158005 A | | 6/2006 | |

OTHER PUBLICATIONS

Japanese Office Action dated Jun. 3, 2014 issued in the corresponding Japanese Patent Application No. 2010-243095 and English language translation (3 pages).

* cited by examiner

*Primary Examiner* — Burton Mullins
(74) *Attorney, Agent, or Firm* — Buchanan Ingersoll & Rooney PC

(57) ABSTRACT

A drive device for a hybrid vehicle, the drive device includes: an input shaft and an output shaft, which are supported by a case to be rotatable around a rotation-axis; a motor, which includes a rotor integrally coupled with the output shaft and a stator fixed to the case; an input-side rotation member and an output-side rotation member, which have an annular shape; a rotation angle sensor, which detects a rotation angle of the rotor, wherein the rotation angle sensor includes: a rotating sensor member coupled with the output-side rotation member; and a fixed sensor member fixed to the case to detect an angle between the rotating sensor member and the fixed sensor member; a protrusion, which protrudes in a radial direction; a groove to receive the protrusion to be inserted; and a restriction portion, which restricts relative rotation between the rotating sensor member and the output-side rotation member.

8 Claims, 5 Drawing Sheets

_US 8,847,447 B2_

MOTOR ASSEMBLY, DRIVE DEVICE FOR HYBRID VEHICLE, AND METHOD OF MANUFACTURING THE SAME

CROSS-REFERENCE TO RELATED APPLICATION

This application claims priority from Japanese Patent Application No. 2010-243095 filed on Oct. 29, 2010, the entire subject matter of which is incorporated herein by reference.

TECHNICAL FIELD

This disclosure relates to a motor assembly, a drive device for hybrid vehicle, and methods of manufacturing the same. Specifically, this disclosure relates a mounting structure of a sensor to detect a rotation angle of a motor.

BACKGROUND

Various types of drive devices for hybrid vehicles having engines and motors have been proposed. For example, there is known a drive device including an input shaft coupled with an engine to be rotatable, an output shaft integrally coupled with a rotor of a motor, and a clutch device coupling the input shaft and the output shaft so that the input shaft and the output shaft are capable of being engaged by or released from each other. The output shaft is coupled with a transmission directly or through a torque converter, so that a power train leading to drive wheels is configured. According to this configuration, a vehicle can use only one of the engine and the motor to run, or use both of the engine and the motor when requiring a large driving force. Further, the motor of vehicle can be used as an electric generator so that a battery is charged by energy regeneration when the engine is driven or when braking the vehicle.

In the above-mentioned configuration, since the input shaft and the output shaft are engaged by or released from each other, the input shaft and the output shaft can rotate independently from each other. Therefore, in order to detect a rotation angle or rotation speed of the rotor of the motor and the output shaft, a rotation angle sensor is generally used. A resolver is frequently used as the rotation angle sensor. A resolver rotor is provided on a rotating member side, and a resolver stator is provided on a static case side. In mounting the resolver rotor and the resolver stator, it is important to eliminate a backlash, which causes a reduction of detection accuracy, specifically, a backlash in a rotation direction. Additionally, since the resolver rotor receives an external force according to acceleration and deceleration with rotating, the resolver rotor is required to have a stable mounting structure. Examples of technologies regarding this kind of resolver mounting structure are disclosed in JP-A-2004-222488 and JP-A-2006-158005.

A brushless motor of JP-A-2004-222488 has a rotation sensor and has a rotor unit for a resolver in an exemplary embodiment. Further, an engagement protrusion of an intercalated member on a rotor shaft side is engaged with an engagement groove formed on the rotor unit for the resolver, so that the rotor unit for the resolver is mounted. Furthermore, the rotor unit for the resolver is interposed between the above-mentioned intercalated member and a stopper having an approximately cylindrical shape, so that dropping in an axis direction is suppressed. Meanwhile, a fixing structure of a resolver rotor of JP-A-2006-158005, a resin is injected and solidified between a hole of the resolver rotor and a rotation shaft disposed inside the hole, so as to fix the resolver rotor. Further, a protrude-shape rotor key is provided at the hole of the resolver rotor to protrude toward the inner circumferential side, and the rotor key is fitted into a convex-shape groove of the rotation shaft.

SUMMARY

However, in JP-A-2004-222488, since the engagement groove of the rotor unit of the resolver and the engage protrusion of the intercalated member, it is difficult to eliminate a backlash due to a dimensional tolerance in manufacturing when both sides are engaged with each other. Therefore, the rotor unit for the resolver may be shacked by the backlash with relative rotation after mounting and adjustment, so that the angle detection accuracy is decreased. Further, since the rotor unit for the resolver is generally formed by stacking magnetic steel plates in the axis direction, a fixing force may be reduced by stress such as thermal shock with time, so that the rotor unit for the resolver may move in the axis direction. Even in JP-A-2006-158005, if durability performance is reduced by thermal shock or the like so that the resin creeps, the fixing of the resolver rotor is likely to loosen so as to relatively rotate by the backlash between the rotor key and the groove.

This disclosure was made considering the above, and this disclosure is to provide a motor assembly, a drive device for a hybrid vehicle, and methods of manufacturing the same, in which a rotating sensor member of a rotation angle sensor is securely and stably mounted by a simple and low-cost member configuration, and a fixing method so that the rotating sensor member does not relatively rotate or move in the axis direction to suppress a reduction of angle detection accuracy.

In view of the above, a motor assembly of this disclosure comprises an output shaft, a rotor, a stator, a rotation angle sensor, a protrusion, a groove, and a restriction portion. The output shaft is supported by a case to be rotatable around a rotation-axis. The rotor is integrally coupled with the output shaft. The stator is fixed to the case. The rotation angle sensor detects a rotation angle of the rotor, wherein the rotation angle sensor includes: an output-side rotation member that has an annular shape and is integrally coupled with the output shaft; a rotating sensor member that is coupled with the output-side rotation member and is disposed coaxially with the rotation-axis; and a fixed sensor member that is fixed to the case coaxially with the rotation-axis to detect an angle between the rotating sensor member and the fixed sensor member. The protrusion protrudes in a radial direction from one side of the rotating sensor member and the output-side rotation member. The groove is formed at the other side of the rotating sensor member and the output-side rotation member to receive the protrusion to be inserted from a rotation-axis direction. The restriction portion restricts relative rotation between the rotating sensor member and the output-side rotation member.

A drive device of this disclosure for a hybrid vehicle, the drive device comprises: an input shaft, an output shaft, a motor, an input-side rotation member, an output-side rotation member, a rotation angle sensor, a protrusion, a groove, and a restriction portion. The input shaft is supported by a case to be rotatable around a rotation-axis and is coupled with a drive source. The output shaft is supported by the case to be rotatable around the rotation-axis. The motor includes a rotor that is integrally coupled with the output shaft and a stator that is fixed to the case. The input-side rotation member has an annular shape and is integrally coupled with the input shaft. The output-side rotation member has an annular shape and is integrally coupled with the output shaft. The rotation angle sensor detects a rotation angle of the rotor, wherein the rotation angle sensor includes: a rotating sensor member that is coupled with the output-side rotation member and is disposed coaxially with the rotation-axis; and a fixed sensor member that is fixed to the case coaxially with the rotation-axis to detect an angle between the rotating sensor member and the fixed sensor member; a protrusion, which protrudes in a radial direction from one side of the rotating sensor member and the output-side rotation member. The groove is formed at the other side of the rotating sensor member and the output-side rotation member to receive the protrusion to be inserted from a rotation-axis direction. The restriction portion restricts relative rotation between the rotating sensor member and the output-side rotation member.

According to an aspect of this disclosure, the rotating sensor member may not relatively rotate or may not move in the axis direction to suppress a reduction of angle detection accuracy.

BRIEF DESCRIPTION OF THE DRAWINGS

The foregoing and additional features and characteristics of this disclosure will become more apparent from the following detailed descriptions considered with the reference to the accompanying drawings, wherein:

FIG. 5A is a state before a swaging process is performed, and FIG. 5B is a state after the swaging process is performed.

DETAILED DESCRIPTION

Figure 1:
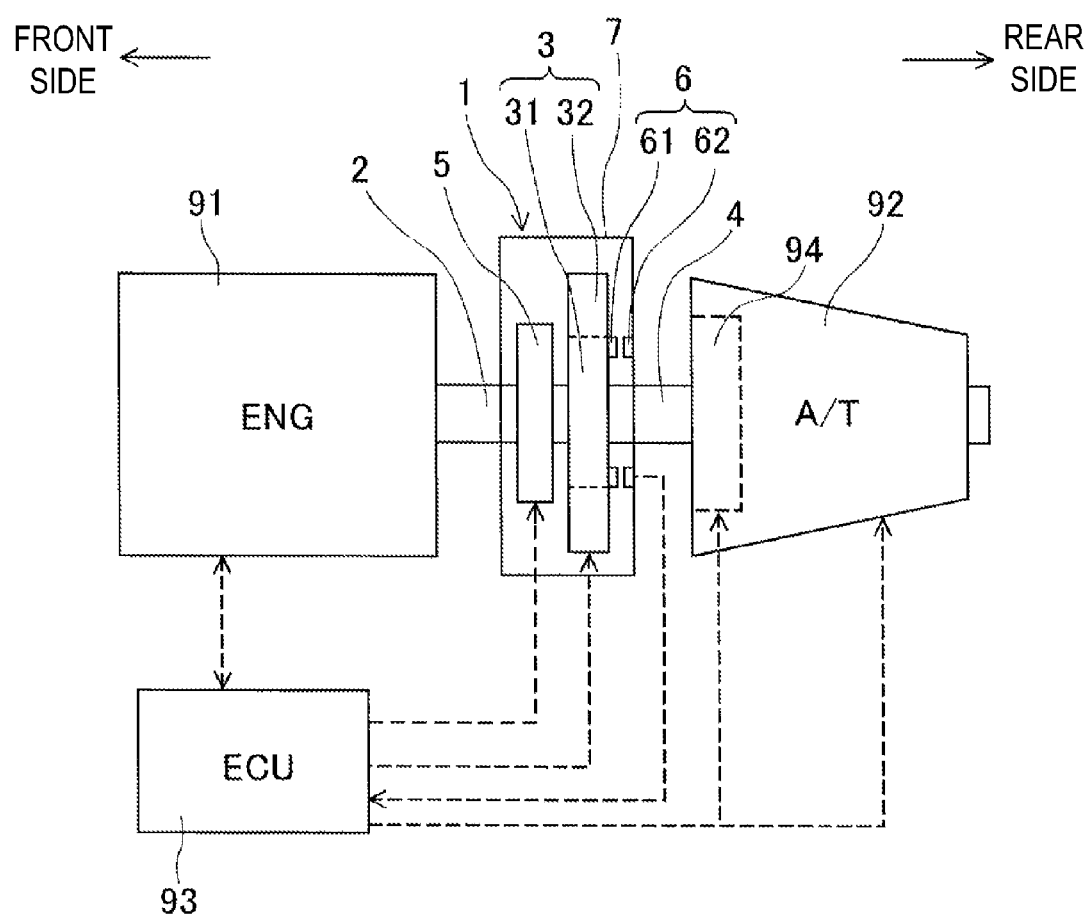
FIG. 1 is a view schematically illustrating a power train for a hybrid vehicle including a drive device for a hybrid vehicle according to an exemplary embodiment.

An exemplary embodiment disclosed here will be explained with reference to the attached drawings.

A motor assembly of the present invention comprises an output shaft, a rotor, a stator, a rotation angle sensor, a protrusion, a groove, and a restriction portion. The output shaft is supported by a case to be rotatable around a rotation-axis. The rotor is integrally coupled with the output shaft. The stator is fixed to the case. The rotation angle sensor detects a rotation angle of the rotor, wherein the rotation angle sensor includes: an output-side rotation member that has an annular shape and is integrally coupled with the output shaft; a rotating sensor member that is coupled with the output-side rotation member and is disposed coaxially with the rotation-axis; and a fixed sensor member that is fixed to the case coaxially with the rotation-axis to detect an angle between the rotating sensor member and the fixed sensor member. The protrusion protrudes in a radial direction from one side of the rotating sensor member and the output-side rotation member. The groove is formed at the other side of the rotating sensor member and the output-side rotation member to receive the protrusion to be inserted from a rotation-axis direction. The restriction portion restricts relative rotation between the rotating sensor member and the output-side rotation member.

According to the above-described motor assembly, the protrusion, which is provided to protrude from one side of the rotating sensor member and the output-side rotation member to the radial direction, is inserted from the rotation-axis direction into the groove formed at the other side of the rotation members to engage, so that the restriction portions restrict the relative rotation between the rotating sensor member and the output-side rotation member. Therefore, the relative rotation between the rotating sensor member and the output-side rotation member can be restricted, so that a reduction of angle detection accuracy of the rotation angle sensor is suppressed.

A drive device of the present invention for a hybrid vehicle, the drive device comprises: an input shaft, an output shaft, a motor, an input-side rotation member, an output-side rotation member, a rotation angle sensor, a protrusion, a groove, and a restriction portion. The input shaft is supported by a case to be rotatable around a rotation-axis and is coupled with a drive source. The output shaft is supported by the case to be rotatable around the rotation-axis. The motor includes a rotor that is integrally coupled with the output shaft and a stator that is fixed to the case. The input-side rotation member has an annular shape and is integrally coupled with the input shaft. The output-side rotation member has an annular shape and is integrally coupled with the output shaft. The rotation angle sensor detects a rotation angle of the rotor, wherein the rotation angle sensor includes: a rotating sensor member that is coupled with the output-side rotation member and is disposed coaxially with the rotation-axis; and a fixed sensor member that is fixed to the case coaxially with the rotation-axis to detect an angle between the rotating sensor member and the fixed sensor member; a protrusion, which protrudes in a radial direction from one side of the rotating sensor member and the output-side rotation member. The groove is formed at the other side of the rotating sensor member and the output-side rotation member to receive the protrusion to be inserted from a rotation-axis direction. The restriction portion restricts relative rotation between the rotating sensor member and the output-side rotation member.

According to the above-described drive device for a hybrid vehicle according, the protrusion which is provided to protrude from one side of the rotating sensor member and the output-side rotation member to the radial direction, is inserted from the rotation-axis direction into the groove formed at the other side of the rotation members to engage, and the restriction portions restrict the relative rotation between the rotating sensor member and the output-side rotation member. Therefore, similarly to the first aspect, the relative rotation between the rotating sensor member and the output-side rotation member can be restricted, so that a reduction of angle detection accuracy of the rotation angle sensor is suppressed.

With respect to the above drive device for a hybrid vehicle, the rotation angle sensor may be a resolver, the rotating sensor member may be a resolver rotor, and the fixed sensor member may be a resolver stator. The drive device further may comprise: a fitting hole that is formed in the resolver rotor and is disposed coaxially with the rotation-axis; a protruding portion that protrudes from an end face of the output-side rotation member; wherein the protruding portion is fitted into the fitting hole, and the protrusion is provided at the resolver rotor to protrude from the fitting hole inward in the radial direction. The groove may be provided concavely at the protruding portion to receive the protrusion to be inserted from the rotation-axis direction. The restriction portion is formed at a position of end face of the output-side rotation member, which is closer to the rotation-axis than the protrusion, by swaging so that gaps between the protrusion and the groove are filled.

In the above-described drive device for a hybrid vehicle, the rotation angle sensor may be a resolver, a fitting hole may be formed at a resolver rotor, a protruding portion may be provided annularly on an end surface of the output-side rotation member, and the protruding portion may be fitted into the fitting hole. Further, the protrusion may be provided at the resolver rotor to protrude from the fitting hole inward in the radial direction, a groove may be provided concavely at the protruding portion to receive the protrusion to be inserted from the rotation-axis direction thereinto, and the restriction portion may be formed at a position on end faces of the output-side rotation member, which is closer to the rotation-axis than the protrusion, by swaging so that gaps between the protrusion and the groove are filled. In this case, the restriction portions can restrict the relative rotation between the resolver rotor and the output-side rotation member. Further, since the shapes of the protrusion and the groove are simple, the swaging process is also easy, it is possible to securely and stably mount the resolver rotor by a simple and low-cost member configuration and fixing method so that the resolver rotor does not relatively rotate or move in the rotation-axis direction.

With respect to the above drive device for a hybrid vehicle, a plurality of top faces of the protrude portions may be swaged so that movement of the resolver rotor in the rotation-axis direction is restricted.

In the above-described drive device, a plurality of top face of the protrude portion may be swaged so that movement of the resolver rotor in the rotation-axis direction is restricted. Therefore, it is possible to securely and stably mount the resolver rotor 61 by a simple and low-cost member configuration and fixing method so that the resolver rotor does not relatively rotate or move in the rotation-axis direction.

With respect to the above drive device for a hybrid vehicle, the case may be configured by a peripheral wall portion, front-side wall portion on a side of the input shaft, and a rear-side wall portion on a side of the output shaft. The peripheral wall portion may be an approximately cylindrical member and is disposed coaxially with the rotation-axis direction.

With respect to the above drive device for a hybrid vehicle, the case may be configured by a peripheral wall portion, front-side wall portion on a side of the input shaft, and a rear-side wall portion on a side of the output shaft. The peripheral wall portion may be an approximately cylindrical member disposed coaxially with the rotation-axis direction.

With respect to the above drive device for a hybrid vehicle, the resolver stator may be supported by a plurality of resolver supporting seats, which are circumferentially arranged the front side of the rear-side wall portion. The each of the resolver supporting seats has a fastening hole, and the resolver stator is fixed by tightening a supporting bolt inserted into the fastening hole after adjusting the angle position of the resolver stator.

With respect to the above drive device for a hybrid vehicle, an annular base portion may be provided at an inner side of output-side rotation member than the protrude portion, and the groove extends to the annular base portion. The restriction portion is formed on an end face in the vicinity of the groove at a position, which is closer to the rotation-axis AX than the protrude portion, by swaging so that an dent is formed at a center of the swaging and the end face is deformed to protrude toward the groove.

The method of manufacturing a drive device for a hybrid vehicle in the present invention includes a process of swaging the output-side rotation member in the vicinity of the protrusion or the groove to restrict relative rotation between the rotating sensor member and the output-side rotation member. The present invention can be implemented even as a method, and operations and effects are the same as those of the above-described aspect.

A drive device 1 for a hybrid vehicle and a method of manufacturing the same according to an exemplary embodiment of this disclosure will be described with reference to FIGS. 1 to 6. FIG. 1 is a view schematically illustrating a power train for a hybrid vehicle including the drive device 1 for a hybrid vehicle according to an exemplary embodiment. In FIG. 1, dashed arrows indicate control flows. The power train for a hybrid vehicle includes an engine (ENG) 91, the drive device 1 for a hybrid vehicle, an automatic transmission (A/T) 92, and so on. The drive device 1 for a hybrid vehicle includes an input shaft 2, a motor 3, an output shaft 4, a clutch device 5, a resolver 6, a case 7, and so on, and includes a motor assembly according to an exemplary embodiment of this disclosure. Further, an electronic control unit (ECU) 93 receives a detection signal from the resolver 6 and controls the engine 91, the automatic transmission 92, the motor 3, and the clutch device 5. The left side of FIG. 1, that is, the input shaft 2 side of the drive device 1 for a hybrid vehicle is the front side, and the right side of FIG. 1, that is, a side of the output shaft 4 is the rear side.

As shown in FIG. 1, the input shaft 2 of the drive device 1 for a hybrid vehicle is supported by the case 7 to be rotatable around a rotation-axis and is coupled to the engine 91. The output shaft 4 is supported by the case 7 to be rotatable around the rotation-axis. The motor 3 has a rotor 31, which is integrally coupled with the output shaft 4, at an inner circumferential side and has a stator 32, which is fixed on the case 7, at an outer circumferential side. The output shaft 4 is coupled with a torque converter 94, and the torque converter 94 is coupled with the automatic transmission 92. The torque converter 94 has a lock-up clutch (not shown) and transmits an output torque from the output shaft 4 after conversion or directly. An output shaft of the automatic transmission 92 is coupled with drive wheels through an axle (not shown). The clutch device 5 engageably and disengageably couples an input-side rotation member (whose reference symbol is omitted) with an output-side rotation member (whose reference symbol is omitted). The input-side rotation member forms an annular shape and is integrally coupled with the input shaft 2, and the output-side rotation member forms an annular shape and is integrally coupled with the output shaft 4. The resolver 6 is a rotation angle sensor to detect a rotation angle of the rotor 31 based on an electromagnetic induction. The resolver 6 includes a resolver rotor 61, which is a rotating sensor member, and a resolver stator 62, which is a fixed sensor member. This disclosure can be implemented without limitations of the types and structures of the engine at the previous stage and the torque converter 94 and the automatic transmission 92 at the next stage.

Figure 2:
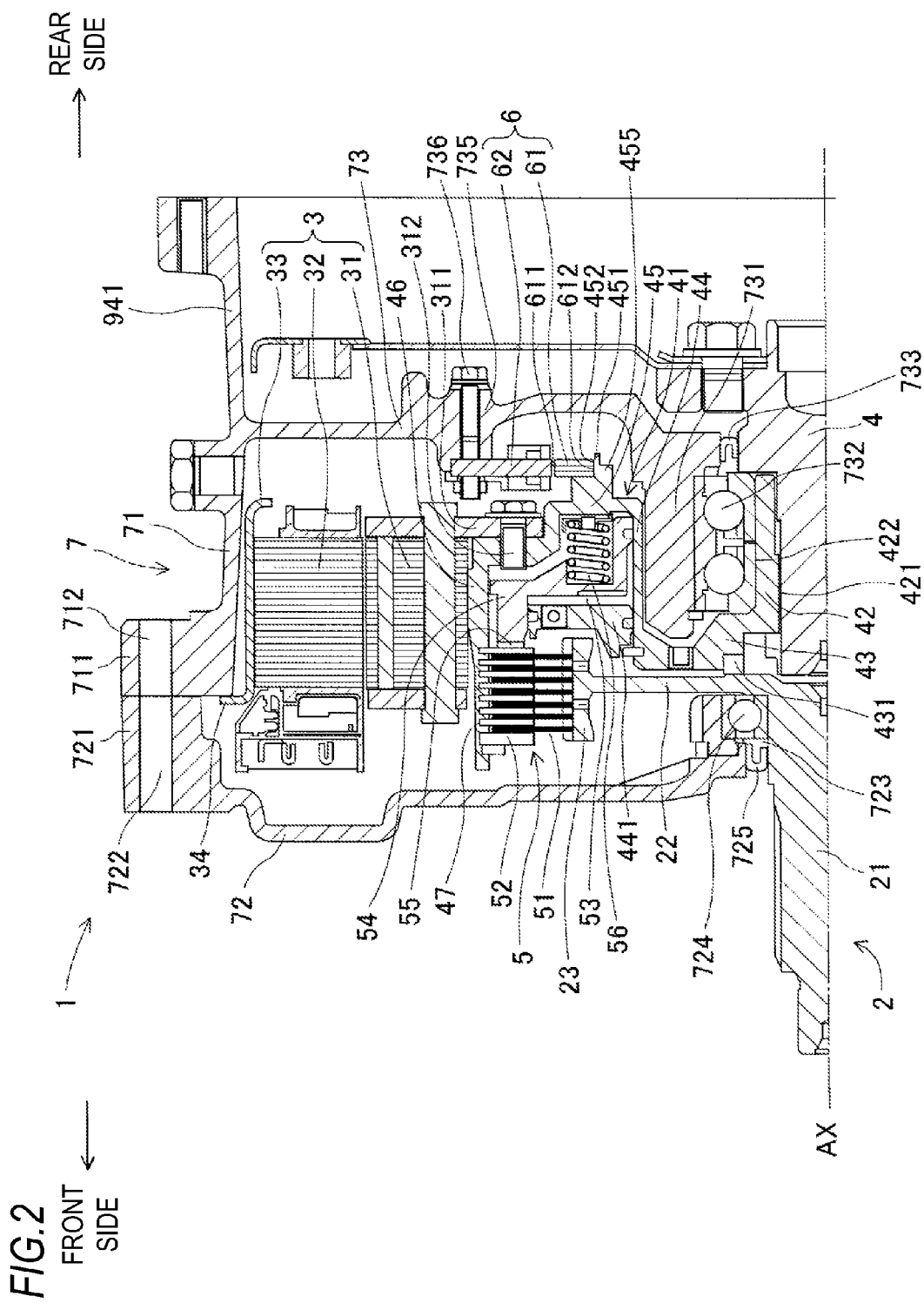
FIG. 2 is a side cross-sectional view illustrating a configuration of a drive device for a hybrid vehicle according to an exemplary embodiment and illustrating an upper half of a rotation-axis.

FIG. 2 is a side cross-sectional view illustrating a configuration of a drive device 1 for a hybrid vehicle according to an exemplary embodiment and illustrating an upper half of the rotation-axis AX. The case 7 includes a peripheral wall portion 71, a front-side wall portion 72 on a side of the input shaft 2, and a rear-side wall portion 73 on a side of the output shaft 4. The peripheral wall portion 71 is an approximately cylindrical member and is disposed coaxially with the rotation-axis direction AX. As shown in FIG. 2, a flange portion 711 is formed on the front side of the peripheral wall portion 71 to be widened outward in a radial direction. Further, the rear-side wall portion 73 integrally extends from the inner side of the rear side of the peripheral wall portion 71 inward in the radial direction perpendicular to the rotation-axis AX. The rear side of the peripheral wall portion 71 extends beyond the rear-side wall portion 73 to the rear side to configure a portion of a case 941 of the torque converter 94.

The front-side wall portion 72 is an approximately disk-shaped member having steps. A flange portion 721 is formed on the outer circumferential side of the front-side wall portion 72. The flange portion 721 of the front-side wall portion 72 and the flange portion 711 of the peripheral wall portion 71 have holes 722 and 712, respectively, at positions facing to couple each other. The flange portions are coupled with each other by tightening coupling bolts. Further, a through-hole 723 is formed on the center side of the front-side wall portion 72, and a ball bearing 724 is provided between the inner circumferential side of the through-hole 723 and the input shaft 2. Therefore, the front-side wall portion 72 supports the input shaft 2 so that the input shaft 2 is rotatable around the rotation-axis AX. Further, an oil sealing unit 725 is provided between the inner circumferential side of the through-hole 723 on the front side relative to a ball bearing 724 and the input shaft 2, so that oil tightness is achieved.

Meanwhile, a supporting seat 731 is provided on the center side of the rear-side wall portion 73 to extend in the rotation-axis direction AX, and a ball bearing 732 is provided on the inner circumferential side of the supporting seat 731. Therefore, the rear-side wall portion 73 supports a drum 41 (which will be described below), so that the drum 41 is rotatable. Further, an oil sealing unit 733 is provided between the inner circumferential side of the supporting seat 731 on the rear side relative to the ball bearing 732 and the output shaft 4, so that oil tightness is achieved. The internal space of the case 7 is partitioned by the peripheral wall portion 71, the front-side wall portion 72, and the rear-side wall portion 73, and oil for lubrication, cooling, and an operation of the clutch device 5 is enclosed.

The input shaft 2 includes a shaft portion 21, a diametrically expanding portion 22, and a clutch seat 23 which are integrally formed. The shaft portion 21 is coupled with the engine 91, the diametrically expanding portion 22 expands outward in the radial direction from the rear end of the shaft portion 21, and the clutch seat 23 extends from the outer circumferential end of the diametrically expanding portion 22 in the rotation-axis direction AX. The shaft portion 21 is supported on the case 7 by the ball bearing 724 of the front-side wall portion 72, so as to be rotatable around the rotation-axis AX. The clutch seat 23 corresponds to the input-side rotation member, which has the annular shape and is integrally coupled with the input shaft 2, and configures a portion of the clutch device 5.

The motor 3 is configured to be approximately symmetrical with respect to the rotation-axis AX. The motor 3 includes the rotor 31, which is disposed on the inner circumferential side, and the stator 32, which is held on the inner side of a cylindrical stator holder 33 and disposed on the outer circumferential side. The stator holder 3 includes a flange portion 34 extending outward in the radial direction from a frond end surface in the rotation-axis direction AX. The flange portion 34 is fixed to the flange portion 711 of the peripheral wall portion 71. In this way, the stator 32 is fixed to the case 7.

Meanwhile, the rotor 31 of the motor 3 is integrally coupled with the drum 41 disposed on the rotation-axis AX. Further, the drum 41 is integrally coupled with the output shaft 4 disposed on the rotation-axis AX. In other words, the rotor 31 and the drum 41 are integrally coupled with the output shaft 4 on the rotation-axis AX. The output shaft 4 protrudes toward the rear side relative to the rear-side wall portion 73 and is coupled with the torque converter 94. The drum 41 is a member having an approximately S-shaped rotation section. The drum 41 includes an inner-side tube portion 42, an inner-side diametrically expanding portion 43, an intermediate tube portion 44, an outer-side diametrically expanding portion 45, and an outer-side tube portion 46, which are integrally formed and will be described below.

The inner-side tube portion 42 being the innermost circumference of the drum 41, which is parallel to the rotation-axis AX, is integrally coupled with the output shaft 4 at an inner circumferential surface 421 and is supported by the ball bearing 732 of the rear-side wall portion 73 side at an outer circumferential surface 422, so as to be rotatable. The inner-side diametrically expanding portion 43 extends in the radial direction from a front end of the inner-side tube portion 42. A thrust needle bearing 431 is provided between the front side of the inner-side diametrically expanding portion 43 and the diametrically expanding portion 22 of the input shaft 2, so that the input shaft 2 and the drum 41 are relatively rotatable. The intermediate tube portion 44 extends from an outer end of the inner-side diametrically expanding portion 43 toward the rear side, and the outer-side diametrically expanding portion 45 extends outward in the radial direction from a rear end of the intermediate tube portion 44. The outer-side tube portion 46 extends from an outer end of the outer-side diametrically expanding portion 45 toward the front side so as to reach an outer circumferential side of the clutch seat 23 of the input shaft 2. The rotor 31 of the motor 3 is provided on the outer circumference of the outer-side tube portion 46. An end plate 311 on the rear side of the rotor 31 extends inward in the radial direction and is fixed on the rear side of the outer circumferential side of the outer-side diametrically expanding portion 45 by a fixing bolt 312.

The clutch device 5 is a multi-plate friction clutch configured in an area surrounded by the intermediate tube portion 44, the outer-side diametrically expanding portion 45, and the outer-side tube portion 46 of the drum 41 and the clutch seat 23 of the input shaft 2. Specifically, a plurality of annular clutch plates 51 is vertically arranged outward in the radial direction from the clutch seat 23 of the input shaft 2. Meanwhile, a clutch seat 47 is also provided on the inner circumferential side of the front side of the outer-side tube portion 46 of the drum 41, and a plurality of annular pressure plates 52 is provided from the clutch seat 47 inward in the radial direction. The clutch plates 51 and the pressure plates 52 are alternately disposed so as to be engageable and disengageable each other. The drum 41 including the clutch seat 47 corresponds to the outer side rotation member, which has the annular shape and is integrally coupled with the output shaft.

Further, a partition member 441 is provided on the outer circumferential side of the front side of the intermediate tube portion 44 of the drum 41, an cylinder space 53 is partitioned as approximately annular shape by the partition member 441, the intermediate tube portion 44, the outer-side diametrically expanding portion 45, and the outer-side tube portion 46. Inside the cylinder space 53, oil tightness is achieved by a seal material, and a piston member 54, which has an approximately annular shape, is operated back and forth in the rotation-axis direction AX by the oil. The piston member 54 is biased toward the front side by a biasing spring 56 having one end fixed to the front side of the outer-side diametrically expanding portion 45. A pressing portion 55 of the front side of the outer circumferential side of the piston member 54 presses the pressure plates 52 in a normal state of FIG. 2 in which the oil is not supplied. That is, the clutch device 5 configures a normally close type. In other word, in the normal state, the input shaft 2 and the drum 41 are engaged with each other and a vehicle is driven the engine 91.

In order to operate the clutch device 5, an electrical oil pump and an oil path are (not shown) are provided. The motor-driven oil pump sucks the oil in the case 7 and supplies the oil to the cylinder space 53 through the oil path. Then, the piston member 54 moves toward the rear side against the biasing spring 56 so as to release the pressing by the pressing portion 55, so that the clutch device 5 is disengaged. In other words, the engagement of the input shaft 2 and the drum 41 is released.

The resolver 6 includes the resolver rotor 61 and the resolver stator 62. The resolver rotor 61 is the rotating sensor member coupled with the drum 41, which is the output-side rotation member, coaxially with the rotation-axis AX. The resolver stator 62 is the fixed sensor member, which is fixed to the case 7 coaxially with the rotation-axis AX, to detect an angle between the resolver stator 62 and the resolver rotor 61. Both of the resolver rotor 61 and the resolver stator 62 are approximately annular members, and the resolver stator 62 is disposed spaced slightly apart from the resolver rotor 61. The resolver stator 62 is supported by a plurality of resolver supporting seats 735, which are circumferentially arranged the front side of the rear-side wall portion 73. Each of the resolver supporting seats 735 has a fastening hole, and an angle position of the resolver stator 62 is adjusted, and then the resolver stator 62 is fixed by tightening a supporting bolt 736 inserted into the fastening hole.

Figure 3:
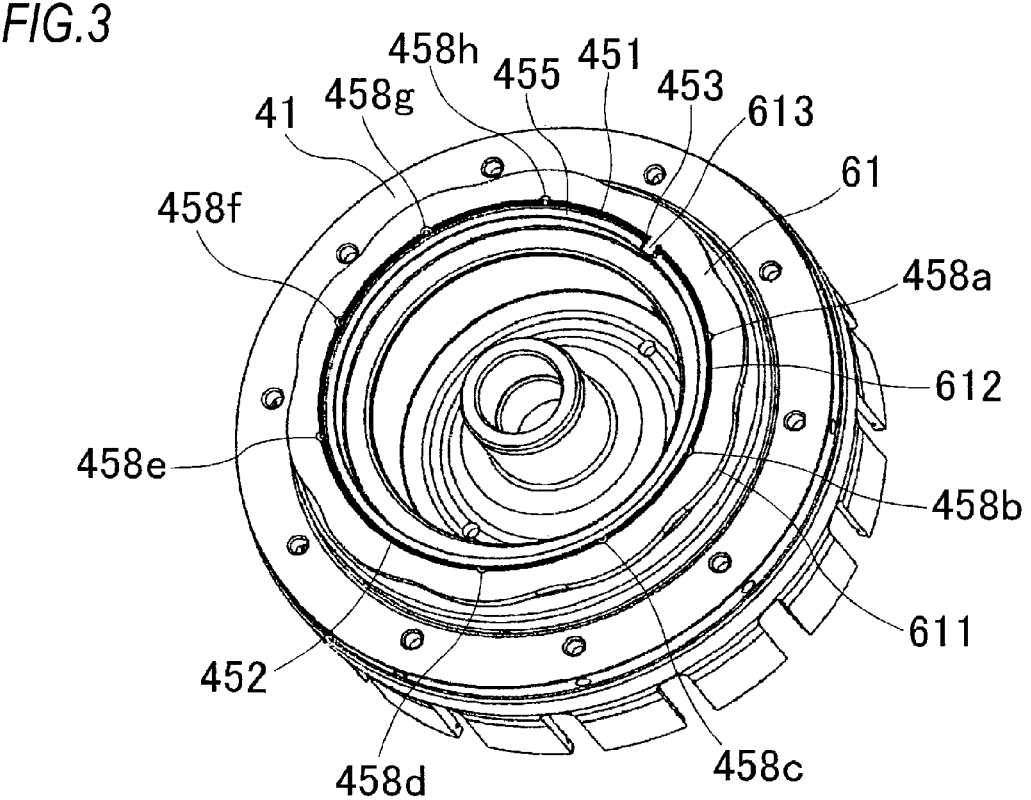
FIG. 3 is a perspective view illustrating an assembled state in which a resolver rotor has been assembled to a drum (output-side rotation member)

FIG. 3 is a perspective view illustrating an assembled state in which the resolver rotor 61 has been assembled to a drum 41. The resolver rotor 61 is formed by stacking a plurality of annular electromagnetic steel plates in the rotation-axis direction, and has a fitting hole 612 formed coaxially with the rotation-axis AX. An outer circumferential surface 611 of the resolver rotor 61 has a shape of a waveform, in which a smoothly undulation is repeated (a wave is repeated ten times in an example of FIG. 3) and is configured so that the rotation angle is detected by a change in distance from the resolver stator 62 according to the rotation angle. On the resolver rotor 61, a rectangular protrusion 613 is provided to protrude inward in the radial direction from one place of the fitting hole 612 in the rotation direction.

Meanwhile, as shown in FIG. 2, at an end surface on the inner circumferential side of the rear side of the outer-side diametrically expanding portion 45 of the drum 41, an protrude portion 451, which has annular shape, is provided to protrude toward the rear side. An outer circumferential surface of the protrude portion 451 is configured as an outer circumferential surface 452 for fitting. An inner portion of the outer-side diametrically expanding portion 45 is an annular base portion 455, which has a diameter smaller than that of the protrude portion 451 and is lower than the protrude portion 451 with respect to a rear direction of the rotation-axis direction AX, As shown in FIG. 3, a groove 453 is convexly provided at one place of the protrude portion 451 in the rotation direction to receive the protrusion 613 of the resolver rotor 61 inserted from the rotation-axis direction AX thereinto. The groove 453 extends to the annular base portion 455.

Figure 4:
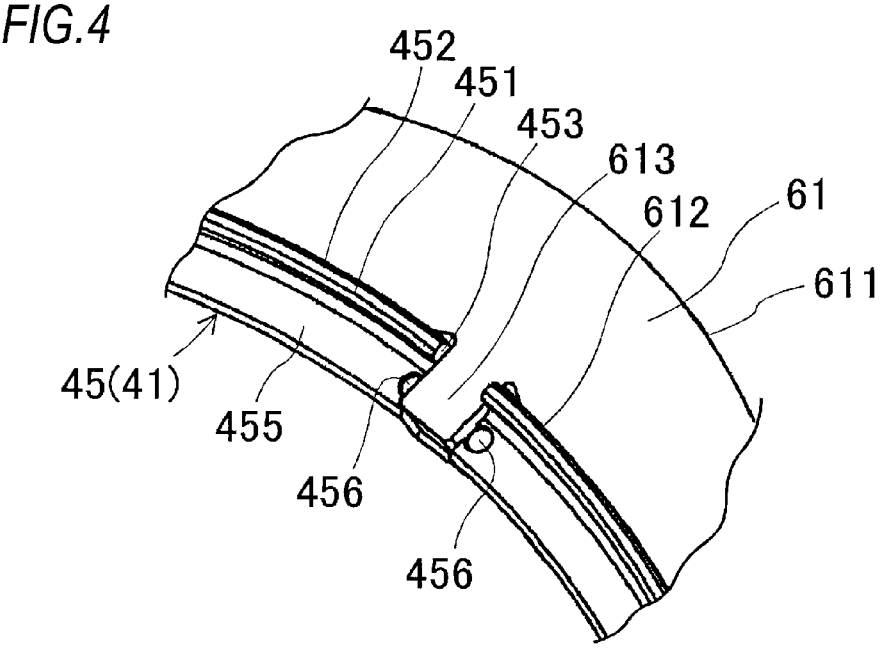
FIG. 4 is an enlarged perspective view of a range including a protrusion and a groove of FIG. 3.
Figure 5A:
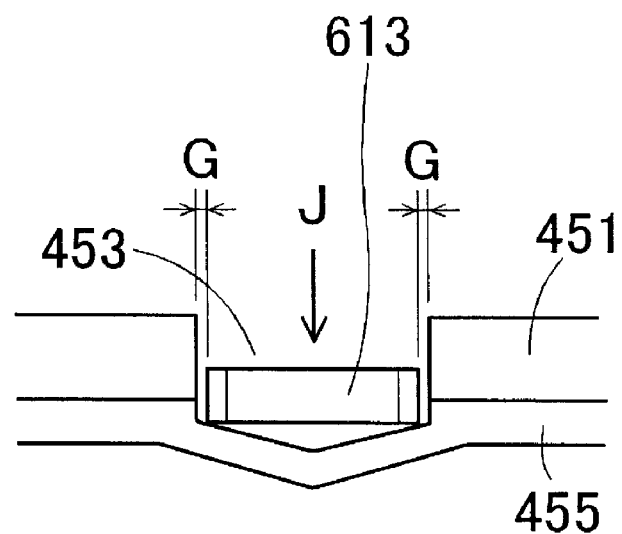
FIGS. 5A and 5B are views schematically illustrating a method of manufacturing a drive device for a hybrid vehicle according to an exemplary embodiment, specifically.
Figure 5B:
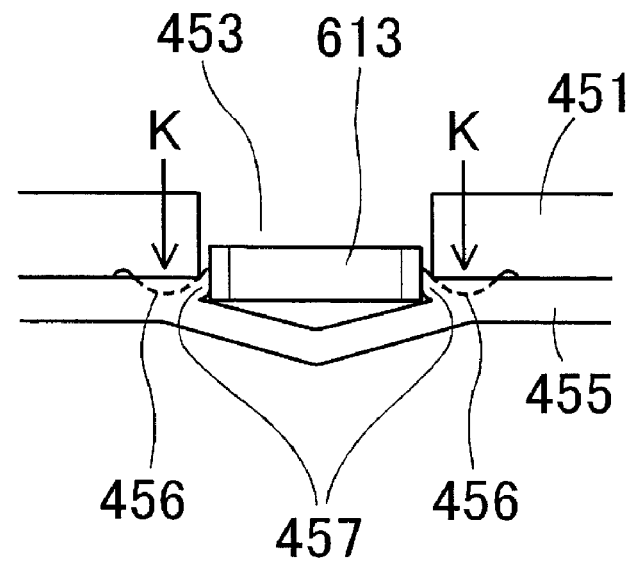

FIG. 4 is an enlarged perspective view of a range including the protrusion 613 and the groove 453 of FIG. 3. As shown in FIGS. 3 and 4, if the resolver rotor 61 is assembled with the drum 41 from the front side of the paper plane, the outer circumferential surface 452 for fitting of the protrude portion 451 of the drum 41 is fitted into the fitting hole 612 of the resolver rotor 61. Further, the protrusion 613 of the resolver rotor 61 is inserted into the groove 453 of the drum 41 from the rotation-axis direction AX. After that, a swaging process shown in FIGS. 5A and 5B is performed. FIGS. 5A and 5B are views schematically illustrating a method of manufacturing the drive device 1 for a hybrid vehicle according to an exemplary embodiment, specifically, FIG. 5A shows a state before a swaging process is performed, and FIG. 5B shows a state after the swaging process is performed.

As shown by an arrow J in FIG. 5A, when the protrusion 613 has been inserted into the groove 453, gaps G in the rotation direction are generated between both sides of the protrusion 613 and groove wall surfaces of the groove 453. In this state, as shown by arrows K in FIG. 5B, by striking end faces of the annular base portion 455 in the vicinity of the groove 453 at positions, which are closer to the rotation-axis AX than the protrude portion 451, the swaging is performed. Then, dents 456 are formed at the centers of swaging, and the end faces are deformed to protrude toward the groove 453 to form restriction portions 457. The restriction portions 457 abut on the protrusion 613 so as to fill the gaps G. In FIG. 5, both of circumferential sides of the protrusion on the end faces of the annular base portion 455 have been swaged. However, only one end of sides may be swaged as long as the gaps G are certainly filled.

Figure 6:
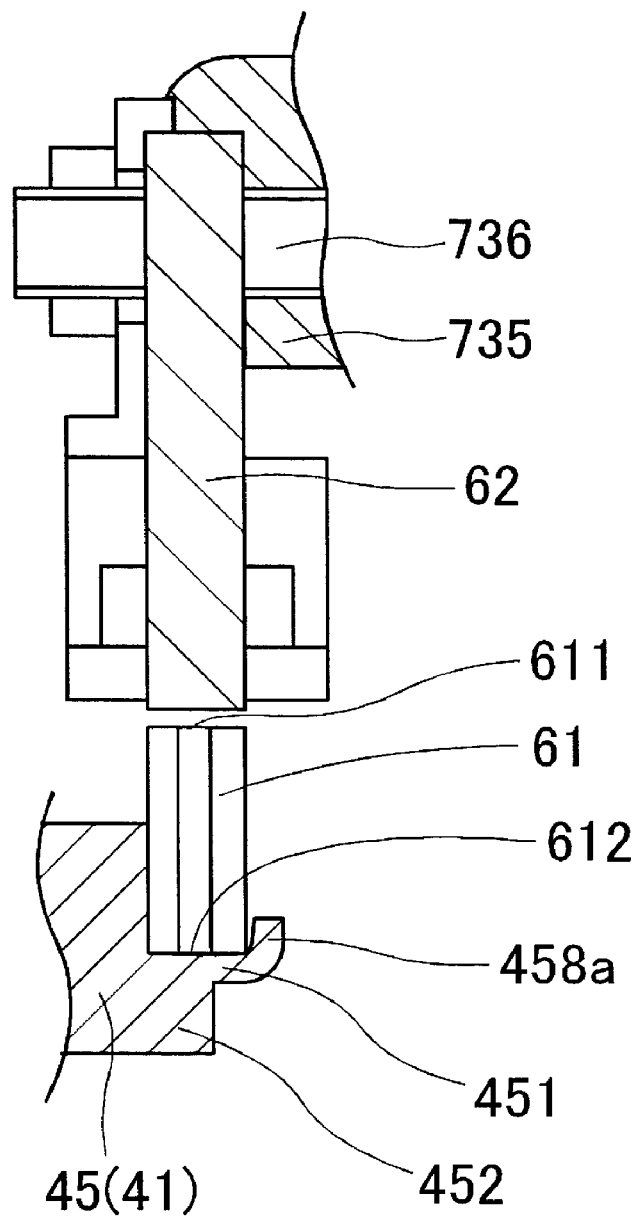
FIG. 6 is a cross-sectional view illustrating an axis-line-direction maintaining unit formed by swaging a top face of a protrude portion of the drum (output-side rotation member).

Further, as shown in FIG. 3, a plurality of the top face of the protrude portion 451 (eight places in the example of FIG. 3) are swaged to form a plurality of axis-line-direction maintaining portions 458a to 458h. FIG. 6 is a cross-sectional view illustrating the axis-line-direction maintaining portion 458a formed by swaging the top face of the protrude portion 451 of the drum 41 (output-side rotation member). As shown in FIG. 6, the top face of the protrude portion 451, which was directed toward the rotation-axis direction AX, is swaged to be bent outward in the radial direction, thereby forming the axis-line-direction maintaining portion 458a. Therefore, the axis-line-direction maintaining portion 458a extends from the fitting hole 612 of the resolver rotor 61 to a side surface of the resolver rotor 61, thereby restricting movement of the resolver rotor 61 in the rotation-axis direction AX.

Effects of the drive device 1 for a hybrid vehicle of the exemplary embodiment configured as described above will be described. According to the present exemplary embodiment, the restriction portions 457 formed by swaging the end faces of the annular base portion 455 so as to fill the gaps G in the rotation direction between the protrusion 613 and the groove 453. Therefore, the relative rotation between the resolver rotor 61 and the drum 41 can be restricted, so that a reduction of angle detection accuracy of the resolver 6 is suppressed. Further, the shapes of the protrusion 613 and the groove 453 are simple, and the swaging process on the end faces of the annular base portion 455 or the top face of the annular protrude portion 451 is also easy. Therefore, it is possible to securely and stably mount the resolver rotor 61 by a simple and low-cost member configuration and fixing method so that the resolver rotor 61 does not relatively rotate or move in the rotation-axis direction AX.

Contrary to the present exemplary embodiment, a protrusion may protrude from the drum 41 outward in the radial direction, and a groove may be provided concavely on the resolver rotor 61 to provide restriction portions between the protrusion and the groove. Further, in the present exemplary embodiment, the resolver 6 as the rotation angle sensor has been exemplified. However, other sensors can be applied. Furthermore, the motor 3 including the rotor 31 disposed on the inner circumferential side has been exemplified and the drum 41 having the approximately S-shaped section has been exemplified as the output-side rotation member. However, the structures thereof are not limited. This disclosure can be applied to not only the drive device 1 for a hybrid vehicle but also a motor assembly. In addition, this disclosure can be variously applied and modified.

What is claimed is:

1. A motor assembly comprising:
an output shaft which is supported by a case to be rotatable around a rotation-axis;
a rotor which is integrally coupled with the output shaft;
a stator which is fixed to the case;
a resolver which detects a rotation angle of the rotor, wherein the resolver includes:
an output-side rotation member that has an annular shape and is integrally coupled with the output shaft;
a resolver rotor that is coupled with the output-side rotation member and is disposed coaxially with the rotation-axis, wherein a fitting hole is formed in the resolver rotor and is disposed coaxially with the rotation-axis; and
a resolver stator that is fixed to the case coaxially with the rotation-axis to detect an angle between the resolver rotor and the resolver stator;
a protruding portion that protrudes from an end face of the output-side rotation member, wherein the protruding portion is fitted into the fitting hole;
a protrusion which is provided at the resolver rotor to protrude from the fitting hole inward in a radial direction;
a groove which is provided concavely at the protruding portion to receive the protrusion inserted in a rotation-axis direction; and
a restriction portion which restricts relative rotation between the resolver rotor and the output-side rotation member, wherein the restriction portion is formed at a position of end face of the output-side rotation member, which is closer to the rotation-axis than the protrusion, by swaging so that gaps between the protrusion and the groove are filled.

2. A drive device for a hybrid vehicle, the drive device comprising:
an input shaft which is supported by a case to be rotatable around a rotation-axis and is coupled with a drive source;
an output shaft which is supported by the case to be rotatable around the rotation-axis;
a motor which includes a rotor that is integrally coupled with the output shaft and a stator that is fixed to the case;
an input-side rotation member which has an annular shape and is integrally coupled with the input shaft;
an output-side rotation member which has an annular shape and is integrally coupled with the output shaft;
a resolver which detects a rotation angle of the rotor, wherein the resolver includes:
a resolver rotor that is coupled with the output-side rotation member and is disposed coaxially with the rotation-axis, wherein a fitting hole is formed in the resolver rotor and is disposed coaxially with the rotation-axis; and
a resolver stator that is fixed to the case coaxially with the rotation-axis to detect an angle between the resolver rotor and the resolver stator;
a protruding portion that protrudes from an end face of the output-side rotation member, wherein the protruding portion is fitted into the fitting hole;
a protrusion which is provided at the resolver rotor to protrude from the fitting hole inward in a radial direction;
a groove which is provided concavely at the protruding portion to receive the protrusion inserted in a rotation-axis direction; and
a restriction portion which restricts relative rotation between the resolver rotor and the output-side rotation member, wherein the restriction portion is formed at a position of end face of the output-side rotation member, which is closer to the rotation-axis than the protrusion, by swaging so that gaps between the protrusion and the groove are filled.

3. The drive device for a hybrid vehicle according to claim 2,
wherein a plurality of top faces of the protruding portions are swaged so that movement of the resolver rotor in the rotation-axis direction is restricted.

4. The drive device for a hybrid vehicle according to claim 2,
wherein the case is configured by a peripheral wall portion, front-side wall portion on a side of the input shaft, and a rear-side wall portion on a side of the output shaft, and
wherein the peripheral wall portion is an approximately cylindrical member disposed coaxially with the rotation-axis direction.

5. The drive device for a hybrid vehicle according to claim 2,
wherein the resolver stator is supported by a plurality of resolver supporting seats, which are circumferentially arranged the front side of the rear-side wall portion,
wherein the each of the resolver supporting seats has a fastening hole, and
wherein the resolver stator is fixed by tightening a supporting bolt inserted into the fastening hole after adjusting the angle position of the resolver stator.

6. The drive device for a hybrid vehicle according to claim 2,
wherein an annular base portion is provided at an inner side of output-side rotation member relative to the protruding portion,
wherein the groove extends to the annular base portion, and
wherein the restriction portion is formed on a portion of the end face which is in the vicinity of the groove and is closer to the rotation-axis than the protruding portion, by swaging so that a dent is formed at a center of the swaging and the end face is deformed to protrude toward the groove.

7. The drive device for a hybrid vehicle according to claim 6,
wherein the restriction portion is formed by swaging at both of circumferential sides of the protrusion on the end face of the annular base portion.

8. A method of manufacturing a drive device for a hybrid vehicle, the drive device comprising: an input shaft, which is supported by a case to be rotatable around a rotation-axis and is coupled with a drive source; an output shaft, which is supported by the case to be rotatable around the rotation-axis; a motor, which includes a rotor that is integrally coupled with the output shaft and a stator that is fixed to the case; an input-side rotation member, which has an annular shape and is integrally coupled with the input shaft; an output-side rotation member, which has an annular shape and is integrally coupled with the output shaft; a rotation angle sensor, which detects a rotation angle of the rotor, wherein the rotation angle sensor includes: a rotating sensor member that is coupled with the output-side rotation member and is disposed coaxially with the rotation-axis; and a fixed sensor member that is fixed to the case coaxially with the rotation-axis to detect an angle between the rotating sensor member and the fixed sensor member; a protrusion, which protrudes in a radial direction from one side of the rotating sensor member or the output-side rotation member; a groove, which is formed at an other of the rotating sensor member or the output-side rotation member to receive the protrusion inserted in a rotation-axis direction; the method comprising:

swaging the output-side rotation member in the vicinity of the protrusion or the groove to restrict relative rotation between the rotating sensor member and the output-side rotation member.

\* \* \* \* \*